United States Patent [19]

Beckerman

[11] Patent Number: 5,305,568
[45] Date of Patent: Apr. 26, 1994

[54] HIGH STRENGTH, LIGHT WEIGHT SHORING PANEL AND METHOD OF PREPARING SAME

[75] Inventor: Norton S. Beckerman, Arlington, Va.

[73] Assignee: Comcore Utilities Products, Falls Church, Va.

[21] Appl. No.: 846,612

[22] Filed: Mar. 5, 1992

[51] Int. Cl.⁵ .......................... F04C 1/00; B32B 3/00
[52] U.S. Cl. .................................. 52/309.4; 52/806; 52/309.12; 52/781; 428/116; 428/73
[58] Field of Search .............. 52/309.12, 309.4, 309.9, 52/309.17, 806, 807, 781, 778; 428/53, 73, 119, 209, 248, 703, 116

[56] References Cited

U.S. PATENT DOCUMENTS

| | | | |
|---|---|---|---|
| 3,298,892 | 1/1967 | Lippay | 428/209 |
| 3,325,037 | 6/1967 | Kohn et al. | 428/119 |
| 3,381,483 | 5/1968 | Huthing, Jr. | 52/781 |
| 3,561,177 | 2/1971 | Agro et al. | 52/309.4 |
| 3,616,111 | 10/1971 | Raech | 428/52 |
| 3,697,633 | 10/1972 | Edgar | 52/309.4 |
| 4,067,164 | 1/1978 | McMillan | 52/309.12 |
| 4,343,846 | 8/1982 | Kohn | 428/116 |
| 4,346,134 | 8/1982 | Hilton | 428/116 |
| 4,379,191 | 4/1983 | Beggs et al. | 52/806 |
| 4,465,725 | 8/1984 | Riel | 52/806 |
| 4,801,483 | 1/1989 | Beckerman et al. | 428/119 |
| 4,956,217 | 9/1990 | Heitkamp | 52/806 |

*Primary Examiner*—Carl D. Friedman
*Assistant Examiner*—Winnie Yip
*Attorney, Agent, or Firm*—Anthony J. DeLaurentis

[57] ABSTRACT

A light weight structural composite panel adapted for use in a vertical orientation in an underground worker protection system is disclosed. The panel comprises first and second fiberglass reinforced resin matrix facing layers and a balsa-containing core means, weighs less than about 5.5 to about 6 lbs. per square foot, and when supported in a vertical plane adjacent an excavation wall, is able to withstand an extended load in Type C solid (OSHA, CFR 1926) of at least 592 pounds per square foot with a minimum safety factor of 3:1. Methods of preparing the panels and methods of assembling the panels into excavation support systems are also disclosed.

8 Claims, 7 Drawing Sheets

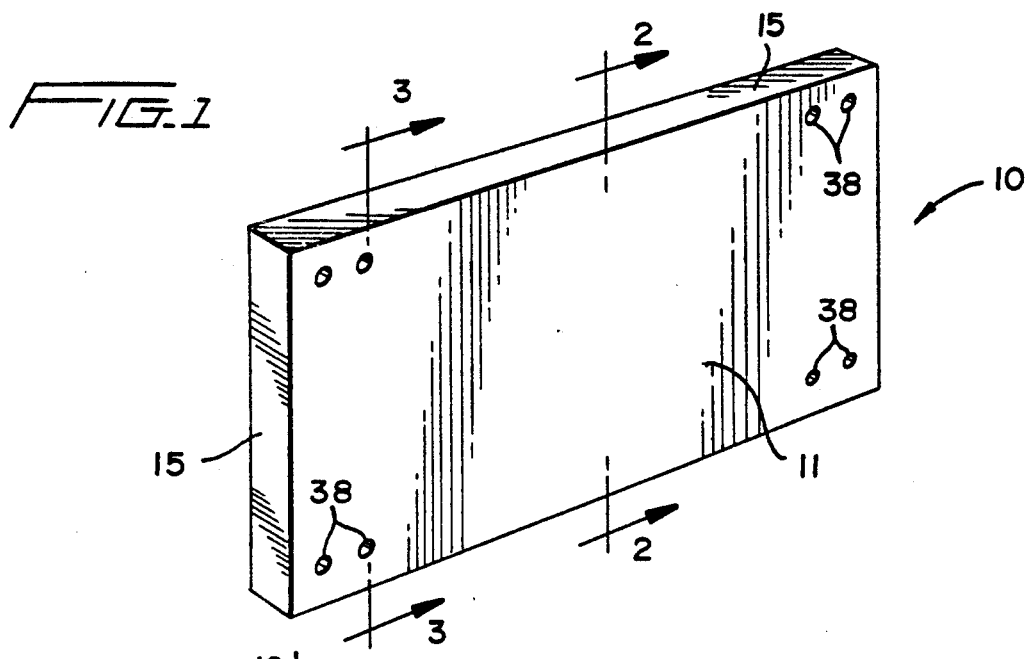
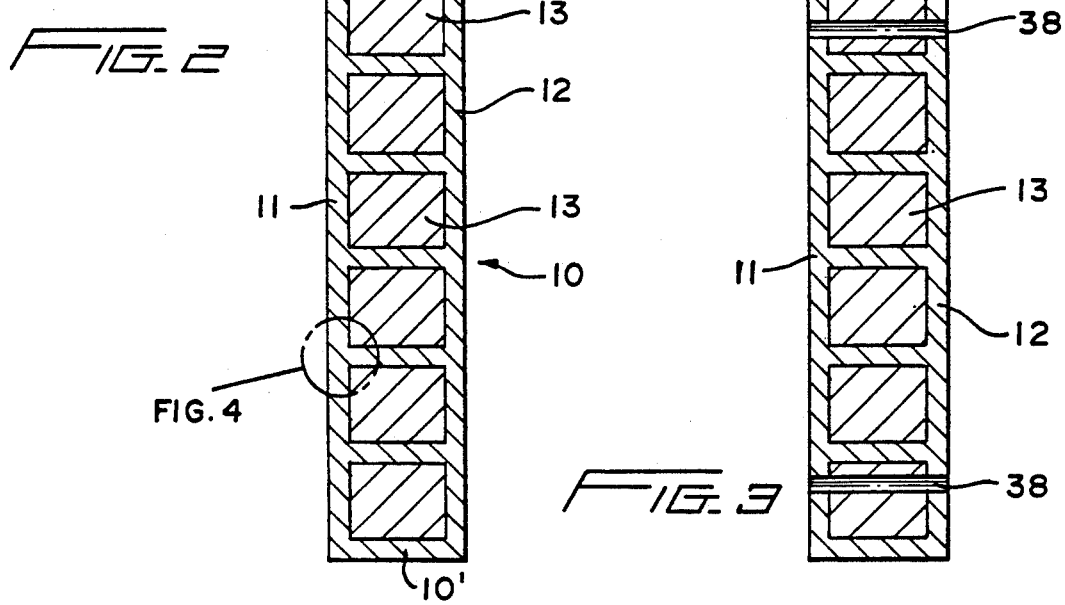
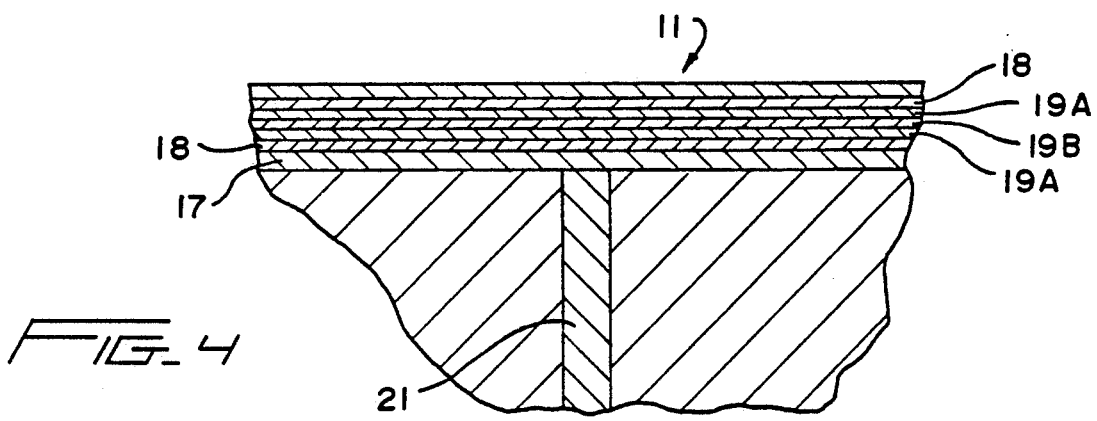

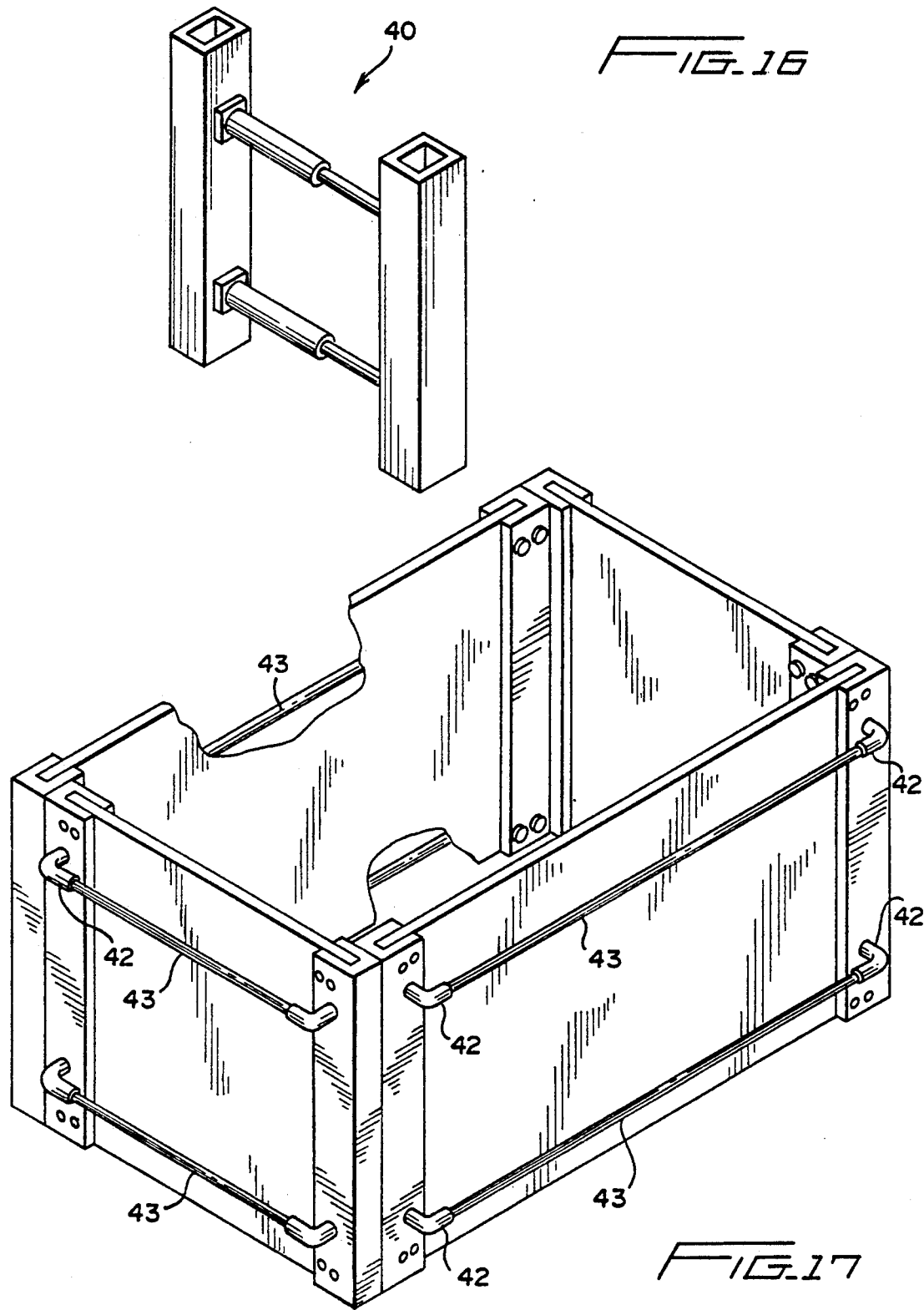

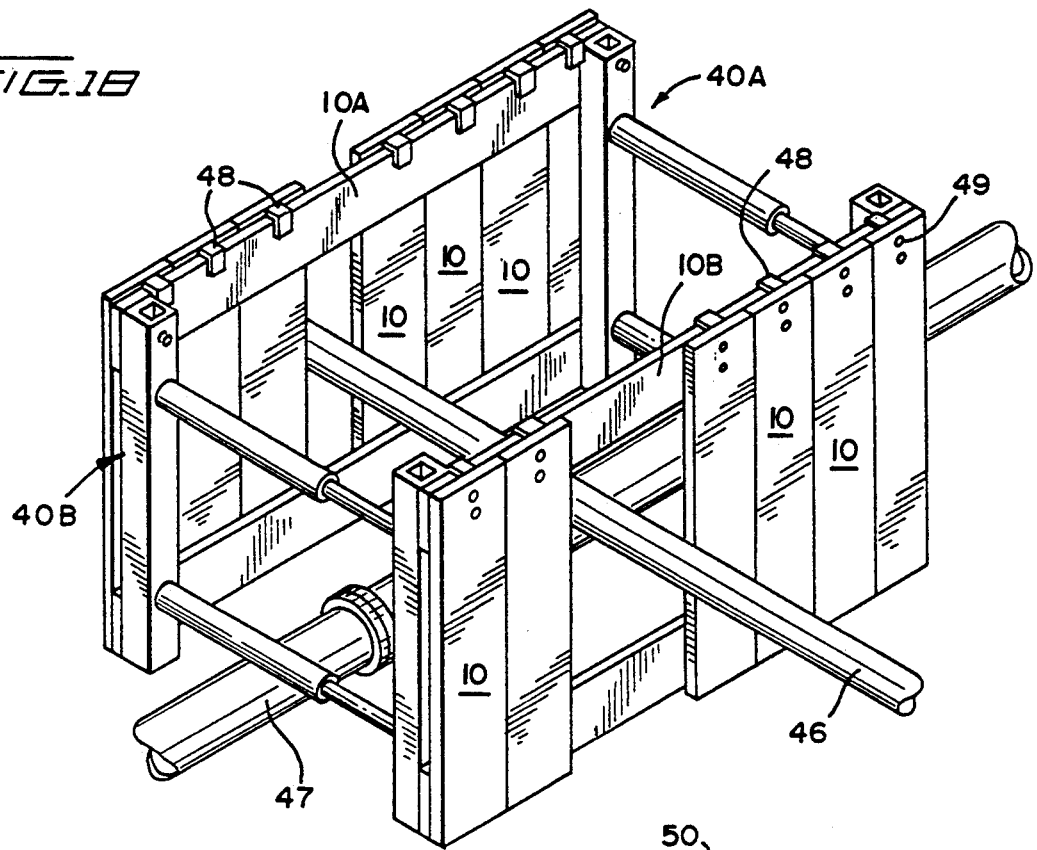
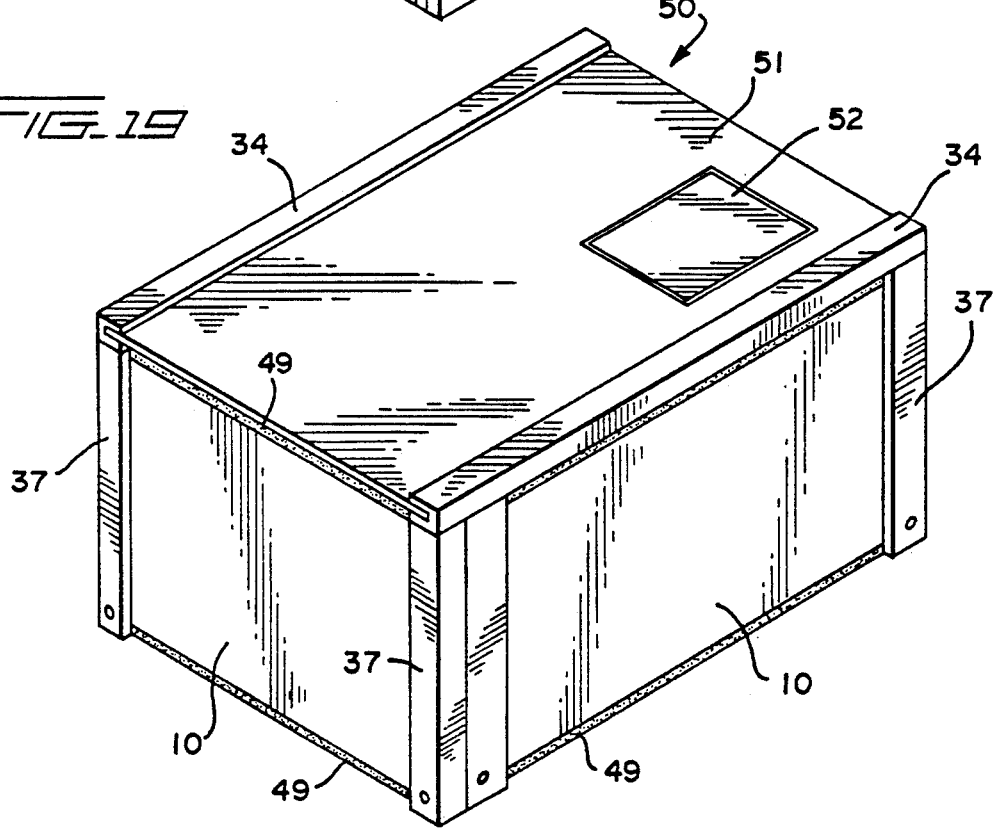

HIGH STRENGTH, LIGHT WEIGHT SHORING PANEL AND METHOD OF PREPARING SAME

BACKGROUND OF THE INVENTION

This invention relates to underground worker protection and more particularly to high strength, light weight structural panels adapted for such use. This invention also relates to methods for preparing the structural panels, methods for assembling the panels and to excavation support systems formed therefrom. The installation, maintenance and repair of underground devices such as pipe, cable, valves, meters, amplifiers and the like require the excavation of a hole typically no larger than 8 feet long by 8 feet wide by 12 feet deep. However, the craftspersons performing the work of installing, maintaining and repairing these underground devices are constantly subjected to potential death and injury as a result of collapsing excavation walls.

Larger excavations remain open for long periods of time and are typically related to costly projects. For this type of excavation the cost of constructing some type of underground worker protection is a small percentage of the total project cost. In contrast, the type of excavations required for the installation, maintenance or repair of underground utility devices are relatively small, and the duration of the work being undertaken frequently is limited to a day or less. This makes the cost, handling and construction of underground worker protection in holes opened for utility work a significant part of the total project cost. As a consequence, without governmental enforcement, the natural result is to avoid their use.

The time and cost problems associated with the use of underground worker protection systems in smaller excavations opened for utility work include:

(1) The large variety of hole sizes, shapes, depths and soil types requiring worker protection;

(2) The inflexibility of available shoring products to accommodate a wide variety of hole sizes, shapes, depths and soil types.

(3) The inflexibility of available shoring products to efficiently accommodate multiple utility service lines coming into the same excavation at unpredictable angles and heights;

(4) The need to use shoring materials that have sufficient strength and structural integrity to withstand the horizontal and vertical pressures exerted on a cut wall or to withstand those produced by a collapsing wall;

(5) The fact that the standard materials currently used to provide the necessary strength (reinforced aluminum, steel, and thick cuts of wood) are heavy; and (6) The products made of these materials require special handling equipment, are cumbersome, time consuming, inflexible and costly to use.

This invention seeks to resolve the problems of time, cost and worker safety when providing underground protection in holes excavated for the purpose of installing, maintaining or repairing some type of utility device such as pipe, cable, meters, valves, signal amplifiers, and the like.

Thus, the invention claimed herein relates to a high strength, light weight structural panel adapted to protect underground workers against the collapse of exposed walls in an excavation. This invention relates specifically to a structural composite panel which is to be used in a vertical plane and which is formed from a fiber reinforced resinous material which is fused or bonded to the exposed edge, top and bottom surfaces of a cellular core material, such as, but not limited to balsa wood, to provide a light weight monolithic composite of exceptionally high strength and load-bearing capacity. The invention also relates to methods for preparing such composites; methods for assembling such composites into an underground worker protection system; and excavation support systems formed therefrom.

U.S. Pat. No. 4,801,483, the disclosure of which is incorporated herein by reference, relates generally to the use of structural composites and, more particularly, to structural composites formed from a fiber reinforced resinous material that is fused to a cellular core material, to provide a light weight, monolithic composite panel of sufficient strength and load bearing capability to be used as a trench cover on road holes or openings where consistent, transient impact shock of the type occurring from the movement of vehicular traffic occurs.

End-grain balsa-core structural materials are widely used in transportation and handling equipment such as for floors of railroad cars, shipping containers, cargo pallets, and bulkheads, as well as in a variety of other similar load-bearing applications. These materials are also employed for structural insulation in aircraft applications, in housing and in boating. The use of structural composite materials, such as that claimed in U.S. Pat. No. 4,801,483, represents a unique use of such materials for withstanding impact shocks. Other balsa-core structural materials and methods for their preparation are described, for example, in U.S. Pat. Nos. 3,298,892 to Lippay, 3,325,037 to Kohn et. al., 4,271,649 to Belanger, and 4,343,846, the disclosures of which are incorporated herein by reference. Also related to balsa-core structures, and incorporated herein by reference, are U.S. Pat. Nos. 3,616,111 and 4,533,589.

There are a number of prior art patents dealing generally with shoring systems and underground worker protection. For example, U.S. Pat. No. 543,056 to Rue relates to the design and construction of a mechanical ditching jack of the type currently being used by underground construction workers. The invention being claimed in the present application proposes to eliminate the need for using such jacks, which are, at best, subject to the possibility of worker movement and collapse.

U.S. Pat. No. 3,224,201 to Brunton discloses an underground shoring system which requires, at a minimum, the use of vertical aluminum rails, aluminum cylinders and, under certain conditions, aluminum wales, all of which are heavy enough to require the use of mechanical lifting equipment for their placement. The Brunton system also requires the use of an external hydraulic system at the job site. Hydraulic shores, such as those disclosed in the Brunton patent, must be positioned every 4 feet on center against an excavation wall such that an 8 foot length would require three sets of shores. Under conditions of type C (OSHA classification) soils, hydraulic shores, such as those set forth in the Brunton patent, require the use of some type of sheeting material between the shores to prevent sloughing. OSHA requirements require this sheeting material to be either 1.125 in. plywood, 0.75 in. birch or 0.75 in. Finform. Moreover, the system described in the Brunton patent provides worker protection for only two opposite walls at any one time, the hydraulic shores disclosed in that patent can be used only where they can be positioned to exert pressure against the excavation wall.

The invention being claimed herein proposes to eliminate the need for using hydraulic shores of the type described in the Brunton patent and, therefore, the hydraulic systems that must accompany it to the job site as well as the need for other types of sheeting such as 1.125 in. plywood or 0.75 in. birch that must be used between shores in Type C soils. The present invention also offers the opportunity to span an area greater than the 4 feet without the use of vertical (soldiers) or horizontal (wales) members. The present invention can be used to provide underground worker protection without having to exert pressure against the walls of an excavation, and can provide four wall, as well as two wall, safety.

U.S. Pat. No. 3,335,573 to Ward relates to a safety lock used on hydraulic shoring such as that described in the abovediscussed Brunton patent. The Ward invention also utilizes a system of wales, which the present invention seeks to eliminate.

U.S. Pat. No. 3,381,483 to Huthsing relates to the construction of sea walls, docks and piers. The Huthsing invention relates specifically to the construction of a permanent structure and requires the use of steel I beams, steel reinforcing bar, concrete panels, and poured concrete to give it both strength and permanence (i.e., the Huthsing structure can not be constructed from light weight materials). In the Huthsing invention, the use of steel I beams, concrete panels and poured concrete require the use of heavy construction equipment such as cranes, pile drivers, cement mixers and flat bed trucks. The construction also requires the welding together of various members. The cost of the constructing the Huthsing permanent structures would be prohibitive in situations involving the maintenance, repair or installation of underground utility equipment such as pipe, cable, meters, valves, or amplifiers. The time required for the construction would prevent its use as a temporary underground worker protection system when installing, repairing or maintaining such things as pipe, cable, meters, valves, amplifiers, etc.. The construction would not be responsive to an emergency situation in terms of either time or manpower. Furthermore, the Huthsing patent does not describe an underground construction.

The present invention eliminates the need for heavy or special construction equipment such as cranes, pile drivers, cement mixers and flat bed trucks. The present invention also eliminates the need for utilizing more than two persons for its construction. Because of its light weight, ease of transport and construction, the protection system of the present invention is highly effective for emergency repair situations. The present invention is portable in that it can be easily carried from job site to job site without special equipment and manpower. Thus, the present invention has the versatility of being used as either a portable or permanent structure.

U.S. Pat. No. 3,420,065 to Holl deals with a shoring system that comprises vertically driven beams, or pilings, and planking. The Holl's shoring system requires some type of cross-bracing or wale system between vertical members and replaces a fixed length system of wooden wales and cross-members. The Holl's invention is for use in a wood shoring system customized by cutting timbers and constructing the shoring system in a hole at a job site.

The present invention is intended to eliminate the use of wales, or cross-members, in a shoring system; and is intended to eliminate the need for the wood or steel construction of a shoring system at the job site. The present invention also eliminates the need for driving steel beams or pilings when constructing a shoring system. The shoring system of the present invention comprises, in one aspect thereof, for a portable worker protection system that can be installed quickly and without heavy construction.

U.S. Pat. No. 3,802,205 to Dickinson relates specifically to a sea wall structure made of steel pilings, steel reinforced concrete block and metal support cables. Although the Dickinson invention utilizes pre-cast concrete parts, these parts must be customized to meet the requirements of the sea wall being constructed. The Dickinson invention requires the use of steel I beams, steel reinforcing bar, concrete panels, poured concrete and pre-tensioned, metal, support cable to give it both strength and permanence. The Dickinson invention refers specifically to the construction of a permanent structure and requires the use of heavy construction equipment such as cranes, pile drivers, cement mixers and flat bed trucks for its construction. Accordingly, the construction contemplated by the Dickinson patent requires the use of more than two people, thereby resulting in a cost of construction that would be prohibitive in situations involving the maintenance, repair or installation of underground utility equipment such as pipe, cable, meters, valves, or amplifiers. Furthermore, the time of construction of the Dickinson invention prevents its use as an underground worker protection system when installing, repairing or maintaining such things as pipe, cable, meters, valves, amplifiers, etc. Moreover, the construction of the Dickinson invention would not be responsive to an emergency situation in terms of either time or manpower. The Dickinson invention does not describe an underground construction.

The present invention eliminates the need for heavy or special construction equipment such as cranes, pile drivers, cement mixers and flat bed trucks; and because of the light weight materials that are used, the protection systems of the present invention can be constructed and handled by as few as two workers. The protection systems of the present invention are highly effective for emergency repair situations and can be transported easily from job site to job site without special equipment and manpower. The protection systems of the present invention are versatile and can be used either as a portable or permanent structure. The system of the present invention are specifically for use as an underground structure.

U.S. Pat. No. 3,864,921 to Marx relates to a shoring system that requires the use of a rigid, outer wall, removed from an excavated trench wall, a liner made of a resilient material for the excavated trench wall, and the filling of the space between the rigid wall and the lined trench wall with some type of gas or air filled envelopes. The Marx system generally is not applicable to the system of the present invention, except perhaps in the use of a mechanical, adjusting cross-member (strut) used to hold the fabricated walls upright and pressed against the excavated trench walls. The use of such a cross-member to support wood and steel materials is accepted practice. However, the present invention generally does not require such a support.

U.S. Pat. No. 3,937,026 to Kring discloses the on-site construction of aluminum, or steel, reinforced panels using a carrier, multiple support members, and two aluminum, or steel, component plates between which the support members are positioned. The Kring invention provides for a friction reducing method of disassembly.

The Kring structure is stationary and requires the use of a foot plate that is pointed and, with pressure, secured into the earth. The Kring structure can be used only by means of expanding support devices that press the reinforced panels against a trench wall, and requires the use of carrier frames so that, by inserting two component plates, its reinforced panels have sufficient thickness and strength to provide appropriate trench safety. The Kring structure requires multiple panels to provide a strength adequate to withstand soil pressures that would result from collapsing excavation walls. In addition, the Kring structure can not be transported to the job site in a crew truck, requires the use of heavy equipment for installation, and is not practical for use in excavations that can be opened and closed in the same working day.

U.S. Pat. No. 4,685,837 to Cicanese discloses an underground form system that requires the use of at least two panels placed side-by-side to form a wall of any size, wherein the panels are joined at their vertical sides by rigid members. In the Cicanese invention an open area for the entrance or exit of such things as pipe or cable must be obtained by cutting or otherwise fashioning the panels, attaching vertical members that support the two original panels and provide a slide for a smaller third panel that acts as a lift door. In the Cicanese invention the panels cannot fit on top of each other so that panel depth is limited by panel size. In the Cicanese invention the Pit Form System is stationary and horizontal brace bars or wales are required to make the entire system rigid and stable.

U.S. Pat. No. 4,917,543 to Cole relates to a wall system that employs a series of extruded polymeric materials, such as PVC, convex in shape and joined together by a system of wales. The Cole invention is intended primarily for use as a sound barrier, or a sea or retaining wall. The Cole wall system has, basically, three configurations, but requires the use of wales and poured concrete for its strength. Without the use of wales and concrete, the Cole wall system becomes essentially a sound barrier. The panels of the wall system must be a series of equally convex shapes. The Cole invention requires the use of a revetment system and is for a permanent, stationary wall structure.

SUMMARY OF THE INVENTION

A primary object of this invention is to provide a light weight structural panel having sufficient strength to protect underground workers from the collapse of any of four excavation walls under the worst soil conditions (designated as Type C by OSHA) and without the use of mechanical jacks, spreaders, hydraulic shores or wale systems.

Another object of this invention is to provide a light weight structural panel having sufficient strength to protect underground workers from the collapse of any of two excavation walls under the worst soil conditions when used with mechanical jacks, spreaders or hydraulic shores.

Still another objective of this invention is to provide a light weight structural panel that does not require the use of wales for protective strength.

Yet another object of this invention is to provide a light weight structural panel than can span an area of at least 6 feet without intermediary supports, such as that provided by vertical members, wales, mechanical or hydraulic shores.

Still another object is to provide a temporary underground worker protection system that is sufficiently light in weight that it can be carried, in its unassembled state, to a job site in a two-person crew truck or van.

Still another objective of this invention is to provide a temporary underground worker protection system that can be adapted to the excavation, fully assembled and inserted all at the job site without customized, costly and time-consuming construction.

Another object of this invention is to provide a temporary underground worker protection system that can be assembled in an excavation by two people remaining on the surface above the excavation.

Another object of this invention is to provide a temporary worker protection system for use in underground construction, such as when fixing or installing pipe, cable, valves, meters, and the like that can be easily customized to fit the requirements of a wide variety of hole sizes and shapes.

Still another object of this invention is to provide a temporary underground worker protection system that can be adapted quickly for use in an excavation having multiple utility services crossing each other at random angles and heights.

Another object is to provide a temporary underground worker protection system that can be easily moved with the progress of the work at the job site.

Yet another object of this invention is to provide a 4-sided pit shield for underground utility workers that is completely dielectric up to, at least, 35,000 volts so as not to conduct or pass high voltage electric current that may be encountered with primary or secondary services in the pit.

Another object of this invention is to provide an underground worker protection system that significantly enhances worker safety while maximizing work flow and cost efficiency.

Yet another object is to provide a system of light weight structural panels that, once used to protect the underground workers on a temporary basis, can be converted to a permanent underground structure having six walls and means of ingress and egress, and being capable of housing and protecting tools and operating equipment.

Another object is to provide a system of light weight structural panels and vertical members that, once used to protect underground workers on a temporary basis, can be converted to a permanent underground structure having four walls, a ceiling and floor, and means of ingress and egress, and being capable of protecting workers underground while doing such work as splicing, connecting, repairing and maintenance.

Still another objective is to provide a permanent underground structure capable of housing tools and operating equipment, and protecting underground workers, that will have significantly reduced costs of maintenance and enhanced operational life over existing structures of a similar type.

Another objective of this invention is to provide a permanent underground structure capable of protecting operational equipment from ground corrosion, water, pests and varmints much more effectively than existing structures of a similar type.

BRIEF DESCRIPTION OF THE DRAWINGS

The above and other objects and advantages of the invention will be appreciated more fully in view of the following descriptions of various preferred embodiments thereof, particularly when considered in view of the drawings wherein:

FIG. 1 is a perspective view illustrating one embodiment of a shoring panel in accordance with the present invention;

FIG. 2 is a cross sectional view taken along line 2—2 of FIG. 1;

FIG. 3 is a cross sectional view taken along line 3—3 of FIG. 1;

FIG. 4 is detail view of that portion of the panel shown in the circle in FIG. 2;

FIG. 16 is a perspective view illustrating one embodiment of a support frame that can be used to support opposing side units in an excavation;

FIG. 17 is a partial perspective view of one embodiment of a frame that can be formed above ground at an excavation site from the panels and posts of the present invention;

FIG. 18 is a perspective view illustrating the use of the invention to provide a protective shield in an excavation having multiple utility services and with those services crossing each other at different heights and random angles to each other; and FIG. 19 is a perspective view of one embodiment of a sealed box or vault which can be prepared from the panels and posts of the present invention.

DESCRIPTION OF PREFERRED EMBODIMENTS

Figure 5A:
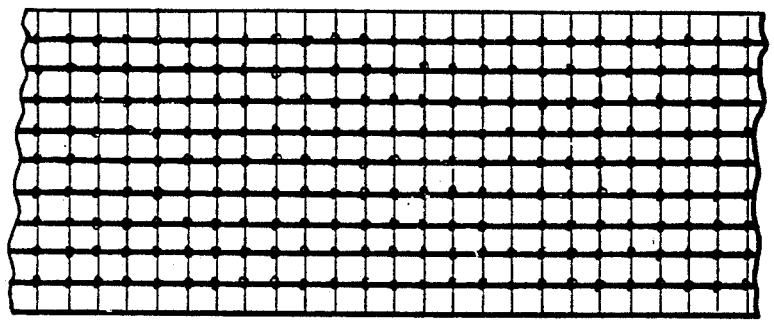
FIG. 5A is a partial, schematic view of a length of uniaxial fiberglass roving material having its reinforcing fibers running in the direction generally parallel to the longitudinal axis of the roving.
Figure 5B:
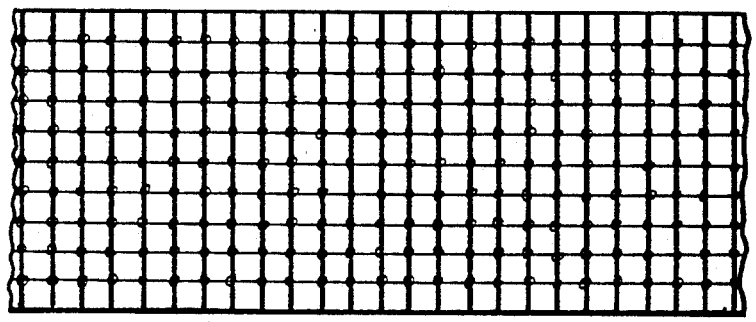
FIG. 5B is a partial, schematic view of a length of uniaxial fiberglass roving material having its reinforcing fibers running in the direction generally transverse or perpendicular to the longitudinal axis of the roving.
Figure 6A:
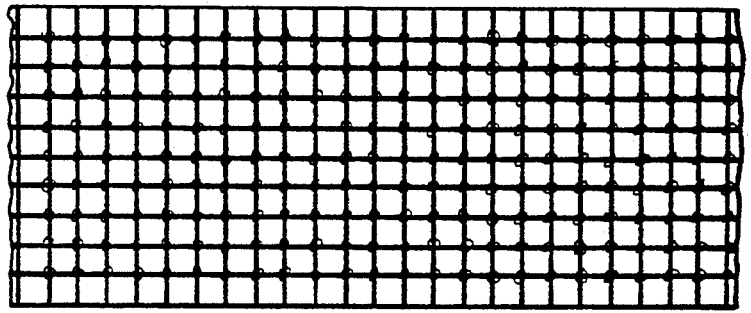
FIG. 6A is a partial, schematic view of a length of biaxial fiberglass roving having its reinforcing fibers running at right angles to each other and generally in the longitudinal and transverse directions relative to the longitudinal axis of the roving.
Figure 6B:
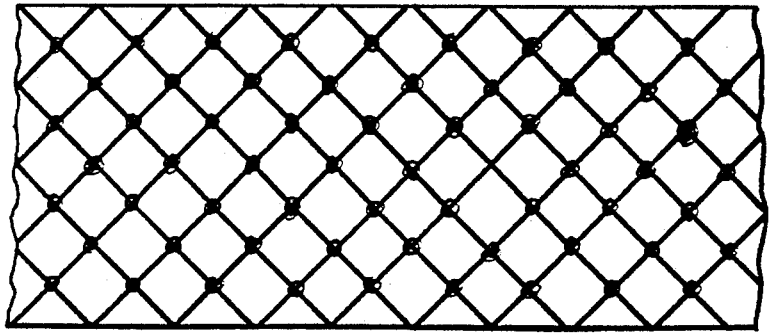
FIG. 6B is a partial, schematic view of a length of biaxial fiberglass roving having its reinforcing fibers running generally perpendicular to each other and at an angle of about 45° and 135° relative to the longitudinal axis of the roving.
Figure 7:
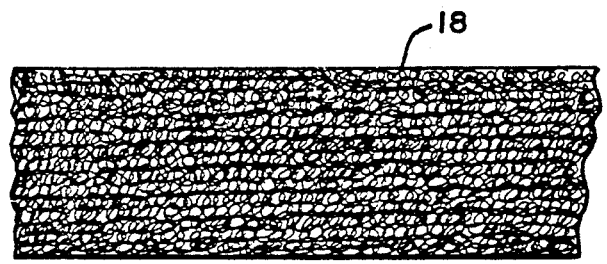
FIG. 7 is a partial, schematic view of a length of fiberglass matting illustrating the generally swirling pattern of the glass fibers.

Referring now to the drawing, there is shown a one embodiment of a light weight structural composite panel 10 (FIG. 1) in accordance with the invention. As shown most clearly in FIGS. 2-4 the composite panel 10 comprises a first reinforced resinous skin or facing layer 11 and a second fiber reinforced resinous skin or facing layer 12 which are integrally fused or bonded to a core structure comprised of a spaced array of cellular material having high load bearing strength, such as end-grain balsa wood blocks 13, such that four end sections 15 extend around the entire perimeter of the panel 10 and connect the facing layers 11 and 12 along the entire periphery thereof.

Figure 12:
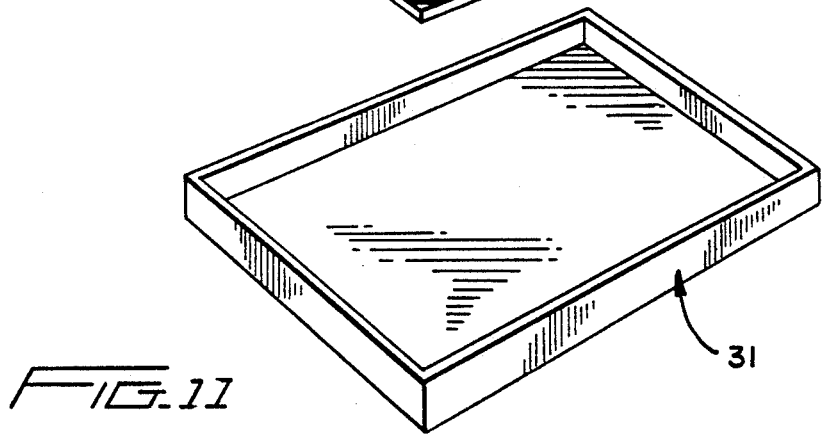
FIG. 12 is a schematic perspective view of the top section of a mold used in the alternative compression molding technique.
Figure 11:
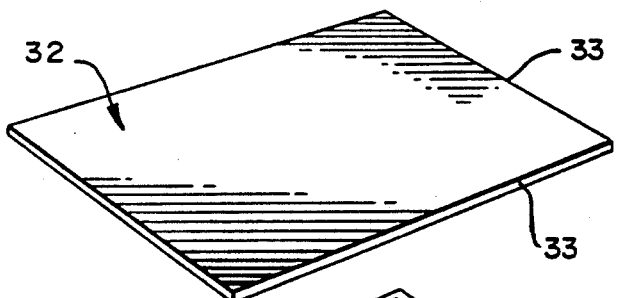
FIG. 11 is a schematic perspective of the bottom section of a mold used to form a shoring panel by an alternative compression molding technique.

The panel 10 may be prepared using one of a variety of molding techniques, such as, for example, vacuum molding, compression molding, resin transfer molding, or a combination thereof. Regardless of the molding technique employed, the panel is constructed in a suitably configured mold, such as a mold 14 (FIG. 8) that is open at the top or such as a mold that is closed at the top by means of a cover or top mold section 32 (FIGS. 11 and 12). Such molds are normally cavity molds that cause the part being produced to be formed upside down, i.e., with the top side on the bottom of the mold as the part is forming and the bottom side on the top of the mold as the part is forming, as will be appreciated more fully in context with the description which follow.

In one preferred embodiment, using vacuum molding techniques, the mold 14 is a cavity mold that preferably will have a flange 16 (FIG. 8) surrounding its outside perimeter. The flange is used as a lip to seal the mold against any seepage of air and to provide openings or holes 29 (FIG. 10) through which a vacuum may be drawn.

The panel 10 is formed by first preparing the mold 14. This is done by applying some type of release coat to the inner surface of the mold to facilitate clean removal of the molded panel therefrom. While numerous commercially available release materials may be used for this purpose, the use of wax as the release material is preferred. Suitable waxes include Carnauba- or honey-based waxes, such as that marketed by Cears Products, Inc. under the tradename CEARA and that marketed under the trade designation Meguiar's Mirror Glaze.

After the release coat is applied, a gel coat 17 is sprayed or brushed onto the release coat to a uniform thickness of between about 5 mills and about 35 mills, preferably from about 15 to about 25 mills, and allowed to dry. The gel coat may be, for example, a polyester gel coat. Suitable polyester gel coats include those marketed by American Cyanamid Co., Plastics Division, under the tradename LAMINAC and designated EPX 117, and by Ram Chemicals under the trade designation RAM 66. A gel coat using about 10%-25% filler, such as aluminum oxide or silicon dioxide, is preferred. Such gel coats have a gel time on the order of about 3-15 minutes at a temperature of 80° F. when catalyzed with a 1% solution of methyl ethyl ketone peroxide. After the gel coat 17 has gelled, i.e., the resin solids partially polymerize to a substantially non-tacky state in which no resin adheres to the fingers when lightly drawn over the gel coat, it should be allowed to further polymerize, i.e., cure, at a temperature between about 50° F. and about 150° F., preferably between about 70° F. and 120° F., for an additional 20-50 minutes.

After the gel coat has cured, one or more layers of resin impregnated fiber reinforcing material should be positioned over the gel-coated surface. The fiber reinforcing material generally will comprise fiberglass matting 18 and fiberglass roving 19 juxtaposed in a plurality of layers. As shown most clearly in FIG. 4, the first layer of material over the gel coat 17 comprises a fiber matting material 18 weighing between about 0.75 lbs. per square foot and about 1.75 lbs. per square foot, a second layer comprises a knitted fiberglass roving material 19A such as that manufactured by Hexel or COFAB, weighing at least about 12 ounces per square yard, preferably 24 ounces per square yard, and having alternating glass fibers approximately at 0° and 90° relative to the longitudinal axis of the roving material (biaxial roving), and a third layer 19B comprising another fiberglass roving material having generally about the same weight per square foot as the previous layer of roving material 19A but having all of its glass fibers extending in the longitudinal or axial direction (uniaxial roving). Additional fiberglass rovings should be built-up in this manner by alternately using the biaxial fiberglass roving 19A and uniaxial fiberglass roving 19B until a thickness of from about 3/16 inches (0.1875 in.) to about ¼ inch has been built-up. Fiberglass rovings of this type are commercially available from King Fiberglass, Inc., Erskine-Johns Co., FRP, Inc. and other such distribution firms.

It will be appreciated that a fiber reinforcing material other than fiberglass material may be used. For example, boron fibers, carbon fibers, aluminum fibers, aramid fibers and the like may be used in place of or in combination with the fiberglass material.

The final layer of fiber reinforcing material to be used to complete the top of the part, and prior to bedding the cellular core structure, will comprise a fiberglass matting material 18 weighing between about 0.75 lbs. per square foot and about 1.75 lbs. per square foot. In a preferred embodiment, matting material of relatively lighter weight, e.g. about 0.75 lbs. per square foot, is used. The placement of this matting material will complete the first skin layer 11 or upper facing portion of the panel 10.

The fiberglass roving may be treated with a silane coupling agent to ensure integral bonding with the resin matrix material. The fiberglass matting and roving may be of the type that employs a conventional high solubility polyester or vinylester resin binder such as those manufactured and marketed by Ashland Chemical Company, Reichold Chemicals, the Cargill Companies and Exxon Chemicals. These resin binders can be applied to the fiber reinforcing materials through the use of rolling, spraying, drawing or pressing mechanisms. In one preferred embodiment, spraying the resin binder on the reinforcing material is preferred.

Such resin binders should have a minimum viscosity of 450 centipoises at 100° F., a specific gravity no greater than 1.15, a minimum tensile strength of 5,000 psi, a minimum flexural strength of 19,000 psi, an elongation of at least 2.2%, and a peak exotherm of no greater than 350° F. After the final layer of fiberglass matting material weighing between about 0.75 lbs. per square foot and about 1.75 lbs. per square foot has been put in place and properly covered with resin binder material of the above described type, the cellular core structure is positioned on the resin impregnated skin layer 11.

The core structure may comprise a variety of light weight, high strength materials, but in one preferred embodiment, a core structure comprised of a spaced array of end-grain, balsa wood blocks 13 is employed because of the exceptionally high strength to weight ratio that is characteristic of such material. When using balsa blocks, the blocks should be pre-cut to a length of from about 1 in. to about 30 in., preferably from about 2 in. to about 12 in., to a width of from about 1 in. to about 30 in., preferably from about 2 in. to about 12 in., and to a thickness of from about 0.25 in. to about 4.0 in., preferably from about 0.5 in. to about 3 in. Blocks on the order of about 2-7 in. in length, 2-7 in. in width and 1.0-3.0 in. in thickness are particularly preferred. The blocks 13 may be pre-wet with resin matrix material in an amount of approximately 30-60 grams per square foot and, preferably, the resin that is used to pre-wet the blocks would be of the same composition as the resin used to impregnate the fiber reinforcing material, as to facilitate the formation of a substantially monolithic panel. The core blocks 13 should be placed on the skin layer 11 in a spaced array such that a small channel-like space 21 is left between adjacent blocks. The channel-like space may have a width on the order of about 1/32 in. (0.0313 in.) to about ¾ in. (0.75 in.), with a width on the order of about 1/32 in. (0.0313 in.) to about ½ in. (0.5 in.) being preferred. The blocks should also be spaced at least about ¼ in. to about 3 in. from the side walls of the mold 14 with a preferred space of about ½ to about ¾ in. from the side walls of the mold. When bedding the cellular core structure on the resin impregnated, fiber reinforced skin layer 11, an even, downward pressure should be exerted on the cellular core structure so as to firmly position the blocks 13 on the skin layer 11 and to force any excess, or pooling, resin upward into the spaces 21 between the blocks 13 of the core material. It is also preferred to work resin down into the spaces 21 between the blocks 13 so that the spaces are completely filled with resin and so that no air remains. This can be accomplished by rolling or spraying resin on the top and sides of the cellular core material and then forcing or drawing the resin into the spaces between the blocks comprising the cellular core. A resin/fiber putty consisting of approximately 35% fiber reinforcing material and 65% resin binder material can be used to fill any spaces that exist between the inner perimeter walls of the mold and the outside perimeter of the balsa core structure. In a more preferred embodiment fiber strands impregnated with resin binder material are used to fill any remaining spaces between the inside perimeter walls of the mold and the outside perimeter walls of the core structure.

The second skin layer 12 of the panel 10, or that portion of the panel facing the open end of the cavity mold 14, is prepared in a manner similar to that of the first skin layer 11, e.g., with a plurality of layers of resin impregnated fiber reinforcing material. In one preferred embodiment of the invention, the second skin layer 12 is formed by first placing a resin wetted fiberglass matting 18 of the same weight previously used (between 0.5 oz. and 1.75 oz.) over the resin coated cellular core blocks 13, followed by a layer of fiberglass roving material which, in turn, is comprised of alternating layers of biaxial fiberglass roving material 19A and uniaxial fiberglass roving 19B. The layer of fiberglass roving material should be built in this manner alternately using the biaxial and uniaxial roving until a thickness of from about 3/16 in. (0.1875 in.) to about 178 in. (0.50 in.) has been built-up.

A finishing layer of fiber reinforcing material may then be applied over the alternating layers of roving to complete the second skin layer 12. This finishing layer may be a fiberglass matting material 18 weighing between about 0.75 lbs. per square foot and about 1.75 lbs. per square foot. The placement of this final layer of matting material will complete the second skin layer 12, i.e., the bottom portion of the panel 10.

The fiberglass matting and roving used to complete the second or bottom skin layer 12 of the panel 10 may be of the type that employs a high solubility polyester or vinylester resin binder such as that used to form the top or first skin layer 11. These resin binders can be applied to the fiber reinforcing material by the use of rolling, spraying or drawing mechanisms, with spraying being preferred.

The relationship of glass fiber to resin matrix materials (binders), by % weight, should be about 30%–70%:70%–30%. Preferably, the relationship would be from about 55%–45%:65%–35%. In an even more preferred embodiment, the weight of fiber material to resin binders should be about 60% glass fiber to about 40% resin binders.

After the bottom skin layer 12 of the panel 10 has been prepared, the mold 14 is sealed so as to prevent air from flowing freely into or out of the mold. In one preferred embodiment, the panel 10 is prepared by placing a silk impregnated material, commonly known in the trade as "peel-n-ply" 26 and sold commercially through such distributors as Erskine-Johns , Inc., King Fiberglass, Inc. and FRP, Inc., over the panel so that it extends onto the flanges surrounding the cavity of the mold 14, but does not cover the openings or air holes 29 through the flanges used for connecting a vacuum source. An absorbent, porous material, such as cotton, flannel or wool, and known as bleeder fabric 22 (FIG. 10) approximately 0.125 inch thick, is then placed over the peel-n-ply so that it extends over the flanges of the mold 14 covering the air holes 29 used to draw a vacuum from the mold cavity. A polyethylene board 23, of approximately 0.50 inch thickness and of the same dimensions as the inside dimensions of the mold cavity, is then placed over the exposed surface of the bleeder material. The board 23 would be provided with a plurality of vent holes 24 to allow air to be drawn from within the mold 14. A plastic packing material 27 containing air pockets and normally referred to as "bubble pack" is then laid over the board 23 so as to distribute the air pressure, created by the vacuum, evenly across the polyethylene board 23. Finally, a polyethylene sheeting material 28 approximately 0.0625 in. thick is placed over the bubble pack material so that its edges cover, entirely, the flanges 16 of the mold 14. This polyethylene sheeting 28 is then sealed to the flanges, for example, with a double sided sealing tape 30 so as to block any inflow or outflow of air to or from the mold. Vacuum tubes are then attached in fluid communication with the openings 29 in the flange 16 in such a way that when the vacuum is activated, air in the mold is drawn out through the bleeder fabric 22, through vent holes 24 in the board 23, and out through the openings 29. In this manner, any entrapped or occluded air that might otherwise remain in the molded panel 10 will have been removed.

The panel 10 should be kept in this state and allowed to rest or cure until it has reached a Barcol hardness of no less than about 40, for example, for a period of from 2.5 to 5 hours. Once the panel has been allowed to cure to a Barcol hardness of no less than about 40, it is removed from the mold, trimmed of any flashing and a final layer of gel coat is sprayed or brushed onto the bottom surface of the panel to a uniform thickness of between about 5 mills and about 35 mills, preferably from 15 to 25 mills, and allowed to dry. The gel coat used would be like that used to coat the mold during the initial stages of panel production. After application, the final gel coat should be allowed to dry for a period of from about 15 minutes to about 60 minutes. If necessary, cosmetic finishing operations can take place at this point.

In a second preferred embodiment, as illustrated in FIG. 11, the panel 10 can be fabricated by a compression molding technique in which the mold used to form the panel is a closed cavity mold comprised of a bottom mold section 31 and top mold section 32. Typically the bottom mold section 31 contains the cavity that describes the outside perimeter of the panel in terms of its width, length, height and shape, while the top mold section 32 is a flat piece that corresponds to the inside perimeter of the bottom mold section. The top mold section 31 is placed into the bottom mold section 31 so that it is positioned parallel to the bottom surface of the bottom mold section. The top section of the mold also describes the outside perimeter of the panel 10, but is approximately 0.002 in. smaller than the inside walls of the bottom section of the mold and has a wall or right angle flange 33 along its perimeter. The height of the flange or wall portion 33 generally is from about 0.25 in. to about 2.5 in. The mold is so fitted with heating elements (not shown) as to be able to generate a temperature of between about 250° F. and about 350° F. within the cavity of the mold. When the panel materials, i.e., matting, roving and resin, have been positioned in the bottom mold section 31, the top mold section 32 is forced downward, typically by means of hydraulic pressure, onto the bottom mold section, forming a shear wall over the inside of the bottom section of the mold. The combination of the pressure and the mold heat causes the resin binder material to flow and forces it through the fiber reinforcing material. During this process, the air entrapped in the molded panel is forced upward so that it escapes through the space that exists between the inner surface of the bottom mold section and the outer surface of the top mold section and dissipates into the surrounding atmosphere. This pressure is typically held for about 3–15 minutes until curing has been completed.

In this second preferred embodiment, the panel 10 is formed by first preparing the top and bottom sections of the mold. This is done by applying some type of release coat to the inner surface of the top and bottom mold sections to facilitate clean removal of the molded panel therefrom. While numerous commercially available release materials may be used for this purpose, the use of wax as the release material is preferred. Surtable waxes include Carnauba- or honey-based waxes such as that marketed by Cears Products, Inc. under the tradename CEARA and that marketed under the trade designation Meguiar's Mirror Glaze.

After the release coat is applied to the top and bottom mold sections, a cosmetic layer gel coat is sprayed onto the release coats to a uniform thickness of between about 5 mills and about 35 mills, preferably from 15 to 25 mills, and allowed to set until it no longer runs. A gel coat using from about 5%–15% of a filler such as aluminum oxide is preferred. The gel coat may be, for example, a polyester gel coat. Suitable polyester gel coats include those marketed by American Cyanamid Co., Plastics Division, under the tradename LAMINAC and designated EPX 117, and by Ram Chemicals under the trade designation RAM 66. Such gel coats have a gel time on the order of 15–25 minutes (the resin solids partially polymerize to a substantially non-tacky state in which no resin adheres to the fingers when lightly drawn over the gel coat) at a temperature of 80° F. when catalyzed with a 1% solution of methyl ethyl ketone peroxide. When heated to temperatures of from 250° F.–350° F. the gel time is reduced to about 0.50 minutes-3 minutes.

Figure 8:
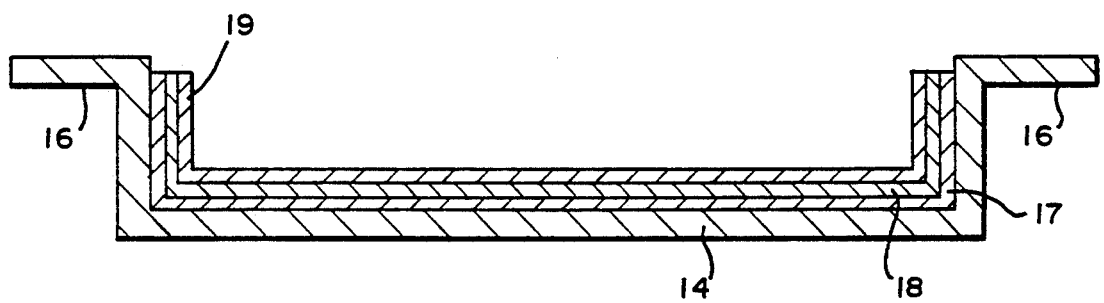
FIGS. 8-10 are partial, schematic sectional views illustrating various successive steps in the process for preparing the shoring panel of FIG. 1.
Figure 9:
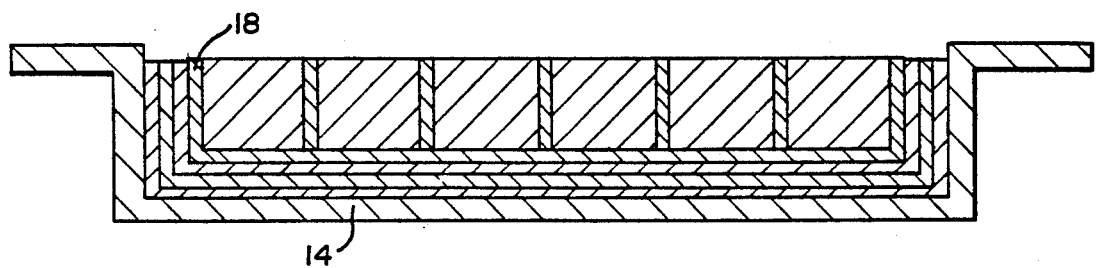
Figure 10:
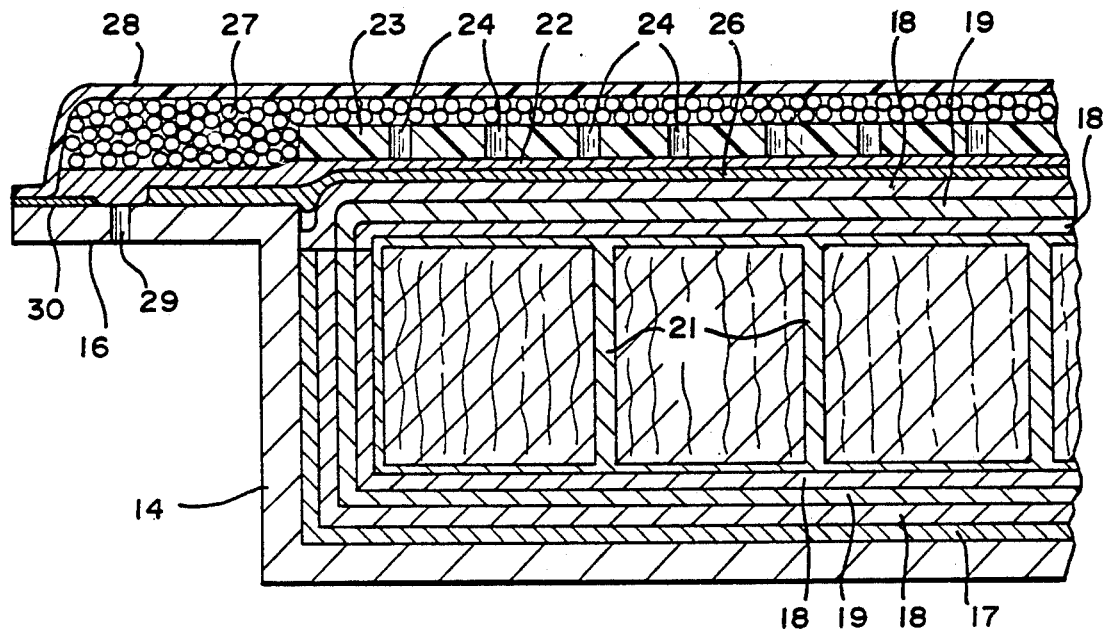

After the cosmetic gel coat layer has cured, one or more layers of fiber reinforcing material should be positioned over the gel-coated surface in the manner described previously in connection with the open mold, vacuum molding technique (FIGS. 8-10). The fiber reinforcing material generally will comprise a fiberglass matting and fiberglass roving (glass fibers joined in such a way as to form a planar surface) juxtaposed in a plurality of layers. As described above, a first layer would comprise a fiber matting material 18 weighing between about 0.75 lbs. per square foot and about 1.75 lbs. per square foot. A second layer would comprise a knitted fiberglass roving material 19A such as that manufactured by Hexel or COFAB, weighing at least about 12 ounces per square yard, preferably about 24 ounces per square yard, and having alternating glass fibers approximately at 0° and 90° relative to the longitudinal axis of the roving material (biaxial roving), and a third layer would comprise another fiberglass roving material 19B having generally about the same weight per square foot as the previous layer of roving material but having all of its glass fiber extending in the longitudinal axial direction (uniaxial roving). Additional fiberglass roving layers should be built in this manner by alternately using the biaxial and uniaxial fiberglass rovings until a thickness of from about 3/16 in. (0.1875 in.) to and ½ in. (0.50 in.) has been built-up. Fiberglass rovings of this type are commercially available from King Fiberglass, Inc., Erskine-Johns Co., FRP, Inc. and other such distribution firms.

A final layer of fiber reinforcing material to be used to complete the top of the panel, and prior to bedding the cellular core structure, would comprise a fiberglass matting material 18 weighing between about 0.75 lbs. per square foot and about 1.75 lbs. per square foot. In a preferred embodiment, the lighter weight matting material is used. The placement of this matting material will complete the upper portion or skin layer 11 of the panel.

The fiberglass roving used in the compression molding embodiment may be of the same type as is used in the vacuum molding embodiment, and may be treated with a silane coupling agent to ensure integral bonding with the resin matrix material. The resin matrix or binder materials used in this embodiment may be of the same type that are employed in the vacuum molding technique. However, unlike the vacuum molding embodiment, the resin binders used in the compression molding embodiment are mixed with approximately 0.5%–3.5% of a high temperature initiator such as benzoyl peroxide. The high temperature initiator prevents the resin binders from curing until they are subjected to a temperature of from about 250° F. to about 350° F., preferably about 290° F.–310° F. At that temperature, the resin cure takes place. Such resin binders are well known and are manufactured and marketed by Ashland Chemical Company, Reichod Chemicals, the Cargill Companies and Exxon Chemicals. These resin binders are typically poured into the bottom mold section 31 on top of the fiber reinforcing material in amounts sufficient to provide a glass to resin ratio of about 65% fiber reinforcing material to 35% resin binder.

The resin binders used in the construction of the panel 11 should have a minimum viscosity of 450 centipoises at 100° F., a specific gravity no greater than 1.15, a minimum tensile strength of 5,000 psi, a minimum flexural strength of 19,000 psi, and elongation of at least 2.2%. After the final layer of fiberglass matting material weighing between about 0.75 lbs. per square foot and about 1.75 lbs. per square foot has been put in place and properly covered with resin binder material of the above described type, the cellular core structure is positioned on top of the resin impregnated upper or first skin layer 11 of the panel.

The cellular core structure may comprise the same structure as described above in connection with FIGS. 8-10. However, when employing a compression molding technique, it is preferable that the core structure have a thickness of from 0.5 in. to about 3.5 in., preferably from between about 1.5 in. and 2.0 in. The balsa material should be heated to a temperature above the boiling temperature of water for approximately 30-60 minutes. After heating, the balsa material may be pre-wet with the resin binder material in the amount of approximately 30-60 grams per square foot. Preferably the binder material used to pre-wet the balsa material would be same type as the resin binder material used to impregnate the fiber reinforcing material so that the cellular core structure will not soak up resin from the resin impregnated reinforcing fiber materials thereby jeopardizing the formation of a substantially monolithic panel. The core structure should then be positioned in the bottom mold section 31 so that an area of from approximately 0.25 in. to about 2.0 in., preferably about 0.75 in., is described between the outside perimeter of the core structure and the inside perimeter of the bottom mold section 31. A compression molding compound, of the type made by Industrial Dielectrics Company of Noblesville, Indiana, and comprised of approximately about 65% fiber reinforcing material and 35% resin binder material, is used to fill any open spaces remaining between the cellular core structure and the inner perimeter of the bottom section of the mold.

The lower or second skin layer 12 of the panel being molded, or that portion of the panel at the open end of the bottom mold section 31 of the compression mold, is prepared in a manner similar to that of the upper or top layer 11, e.g., with a plurality of layers of resin impregnated fiber reinforcing material. In one preferred embodiment, the second skin layer 12 is formed by first placing a resin wetted fiberglass matting of the same weight previously used (between about 0.5 oz. and about 1.75 oz.) over the resin coated cellular core blocks, followed by a layer comprised of a knitted, biaxial fiberglass roving material, such as that manufactured by Hexel or COFAB, weighing at least 12 ounces per square yard, and a layer of knitted fiberglass uniaxial roving having generally about the same weight per square foot as the biaxial roving material. The skin layer should be built in this manner alternately using biaxial and uniaxial roving until a thickness of from about 3/16 in. to about ½ in. has been built-up. Once the upper skin layer 12 of the panel is completed, as just described, a finishing layer of fiber reinforcing material can be applied to the exposed layer of the panel.

The finishing layer of fiber reinforcing material to be used to complete the second or bottom skin layer 12 of the panel 10 generally will comprise a fiberglass matting material weighing between about 0.75 lbs. per square foot and about 1.75 lbs. per square foot. The placement of this final layer of matting material will complete the bottom portion of the panel.

The relationship of glass fiber to resin matrix materials (binders), by % weight, should be about 30%–70%:70%–30%, preferred from about 45%–55%:65%–35%. In an even more preferred embodiment, the weight of fiber material to resin binders should be about 60% glass fiber to about 40% resin binders.

Once the bottom portion of the panel has been completed, a last layer of gel coat is applied to the exposed surface of the panel to a uniform thickness of between about 5 mills and about 35 mills, and preferably from about 15 to about 25 mills. The gel coat used would be like that used to coat the mold during the initial stages of panel production.

When the positioning of the materials in the mold has been completed, the top mold section 32 is lowered onto the bottom mold section 31 thereby closing the mold. The inside of the mold is then raised to a temperature of from about 250° F. to about 350° F., a preferred temperature being from about 290° F. to about 310° F. When the proper temperature has been reached, the top mold section 32 is forced down on the materials in the bottom mold section 31 under a pressure of from about 10 psi to about 900 psi, with a pressure of about 30–60 psi being preferred.

The panel should be kept in this state and allowed to rest or cure for a period of from about 3 to about 20 minutes. Once the panel has been allowed to cure to a Barcol hardness of no less than 40, it is removed from the mold and trimmed of any flashing. If necessary, cosmetic finishing operations can take place at this point.

Composite structural panels prepared in the manner described above are particularly suitable for use as underground walls capable of protecting utility workers from collapse of any or all of the four walls in an underground excavation of the type used to install, maintain or repair such devices as pipe, cable, meters, valves, amplifiers and the like. However, such a panel is equally effective when providing underground utility workers protection in an area requiring that the workers be protected from the collapse of only two walls. Protection from the collapse of only two walls would occur when two walls of the hole are sloped back at an angle appropriate for the soil type or when two walls of the hole are a substantial distance from the worker such as would be encountered in a long trench.

Figure 13:
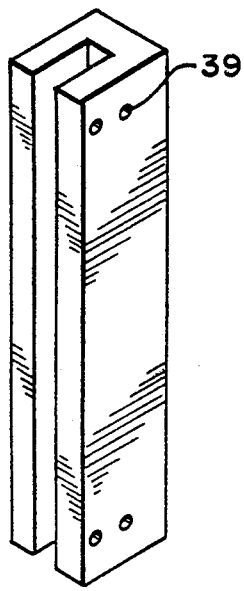
FIG. 13 is a perspective view illustrating a unit post which can be used when constructing a wall assembly from shoring panels as illustrated in FIG. 1.
Figure 14A:
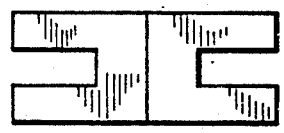
FIG. 14A and 14B are plan views illustrating a side post and a corner post, respectively, prepared from unit posts of illustrated in FIG. 13.

To function in the manner of providing underground workers protection against the collapse of any or all of four walls, the panels must have some means of remaining erect and in position in a generally vertical plane or orientation. This may be accomplished through the use of channeled posts such as the unit post 34, side post 36 and corner post 37 illustrated in FIGS. 13, 14A and 14B, respectively, where the panel 10 is fixed to the channeled posts by means of a fastener, such as a bolt or hitch pin. Holes 38 and fastening pins 41 (FIG. 15) having no less of a diameter than about ⅜ in. should be placed in the panels 10 such that they will match up with equivalent sized holes 39 in the channeled posts. The fastening pins 41 should be placed through the holes 38–39 such that the panels 10 and the posts are secured together.

The various posts may be provided with coupling means such as elbows 42 which are adapted to receive rod members or pipes 43 to facilitate erecting a support frame 44 from a plurality of posts (FIG. 17). Such a support frame can be erected quite easily at a job site, either on the ground or in an excavation, and can be used to construct composite panel structures of various sizes and shapes.

Where underground protection is required against the collapse of only two walls, the panels 10 can be used in conjunction with mechanical or hydraulic spreader means (FIG. 16). When mechanical or hydraulic spreaders are used with a panel of the type described herein, they can be placed at each end of the horizontal expanse of the panel so that the spreaders are placed along the vertical distance of the panel at right angles to the excavation floor. An important feature of the present invention is that the panels 10, although being very light weight, are strong enough that they can be supported in the vertical position, i.e. at right angles to the excavation floor, while being supported only along the vertically oriented end or edge portions thereof, without the need for intermediary supports along the length of the respective panels.

Typically, panels of the type contemplated herein would be constructed in the same thickness, e.g., on the order of about 1 and ½ in. to about 3 in. Width and length would vary, e.g., 3 ft.×6 ft., 4 ft.×4 ft., 2 ft.×8 ft. and so on, such that the panels of this invention could be used to provide underground utility worker protection in a wide variety of hole sizes. For example, a panel having the dimensions of 4 ft. in width and 8 ft. in length could be used such that the 8 ft. length will run parallel to the excavation floor and such that the 4 ft. width will run at right angles to the excavation floor; or such that the 4 ft. length will run parallel to the excavation floor and the 8 ft. width will run right angles to the excavation floor. Panels of other lengths and sizes, such as 3 ft.×6 ft. or 4 ft.×4 ft., could be used accordingly. In addition, panels can be stacked upon one another, edge to edge, to form a wall of a specific height, e.g., three panels each 4 ft.×6 ft. could be stacked one atop the other to form a wall that measured 6 feet wide by 12 ft. deep; or two panels could be stacked atop each other to form a wall 6 ft. wide by 8 ft. high; or by stacking different width panels, such as panels 2 ft.×8 ft., 3 ft.×8 ft. and 4 ft.×8 ft., a wall 9 ft. high by 8 ft. wide could be formed. Using the panels in this manner would allow the user to provide underground worker protection for over one hundred different size rectangular or square holes with an inventory of only ten different panel sizes.

Because of its light weight, generally less than about 6 pounds per square foot, and preferably less than about 5.5 pounds per square foot, a panel prepared in accordance with the present invention could be delivered to a job site in a conventional van or crew truck. Furthermore, an underground protective structure made of these panels does not require special crew or handling equipment such as crane trucks, back hoes, etc. and the crew required for their operation. An underground structure prepared from these panels could be assembled in the hole, and disassembled, by only two craftspersons remaining at the surface level outside of the hole without the assistance of special equipment. Because of their light weight and ease of handling, an underground protective structure using these panels can be quickly and easily assembled and disassembled.

A structural composite panel prepared in accordance with this invention, supported no more than 5 inches on each end in a vertical plane, and weighing no more than about 5.5 to about 6 pounds per square foot, will withstand an extended load in Type C soils (OSHA, CFR 1926), at least, 107.64 times its own weight, or 592 pounds per square foot with a minimum safety factor of 3:1. Structural composite panels prepared in accordance with this invention, therefore, would provide persons working at depths of 12 feet or less, in Type C soils, protection against wall collapse with a significant margin of safety.

As described in OSHA (Occupational Safety and Health Administration, Labor), CFR 1926, Type C soils means:

(i) cohesive soil with an unconfined compressive strength of 0.5 tsf (48 kPa) or less; or (ii) granular soils including gravel, said or loamy sand; or (iii) submerged soil or soil from which water is freely seeping; or (iv) submerged rock that is not stable; or (v) material in a sloped, layered system where the layers dip into the excavation or a slope of four horizontal to one vertical (4H:1V) or steeper.

The Congressional Federal Register (CPR) 1926, subpart M-amended, and published Oct. 31, 1989, requires specific types of protection against wall collapse for persons working in underground excavations having a depth of four feet or more. In this situation a shoring system constructed of wooden beams, wales and sheeting can be used. Also permitted is a trench shield typically constructed of some type of steel or reinforced aluminum and having support struts positioned at right angles to its walls. A trench shield of this type provides protection against the collapse of only two walls. The remaining two walls must be cut back or excavated to an angle from the trench floor of from 34 degrees in type C soils to 53 degrees in type A soils. Positioning steel sheeting in the open trench, wherein the steel sheeting has a thickness of about 0.75 in. thick and a width equal to the opened trench shield, is also an alternative to providing worker protection on the two sides left open by the trench shield. Panels prepared in accordance with this invention and joined together to form a square or rectangular structure (FIG. 17) would provide underground workers with four wall protection and eliminate the need for cut backs or the use of steel sheeting in the excavation.

Water and drain pipe are installed in long trenches and joined at 13 foot intervals. The underground workers are typically concentrated at the joining points of the pipe. Vertical, hydraulic shores positioned every 4 feet against the excavation walls, with an approved thickness of sheeting materials such as plywood and white birch, is a typical method of providing underground worker protection in such a trenching situation. However, while the pipe laying operation is rapid, with connection and backfilling frequently taking place within minutes of each other, the use of vertical shores and sheeting members is a slow and time consuming operation. Accordingly, underground workers must exit the holes and come to surface level while the hydraulics are released and the sheeting material removed. The entire structure must then be reinstalled at the area where the next sets of pipe will be joined. This operation can take place as many as 77 times during the installation of 1000 feet of pipe. By using the panels prepared in accordance with this invention, a structure can be assembled that would eliminate the use of sheeting when using vertical hydraulic shores, allow the protection device to be moved forward in the trench as the under-ground workers progress from pipe joint to pipe joint, and allow the workers to safely remain in the trench when moving forward in the installation process.

Figure 14B:
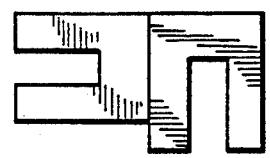
Figure 15:
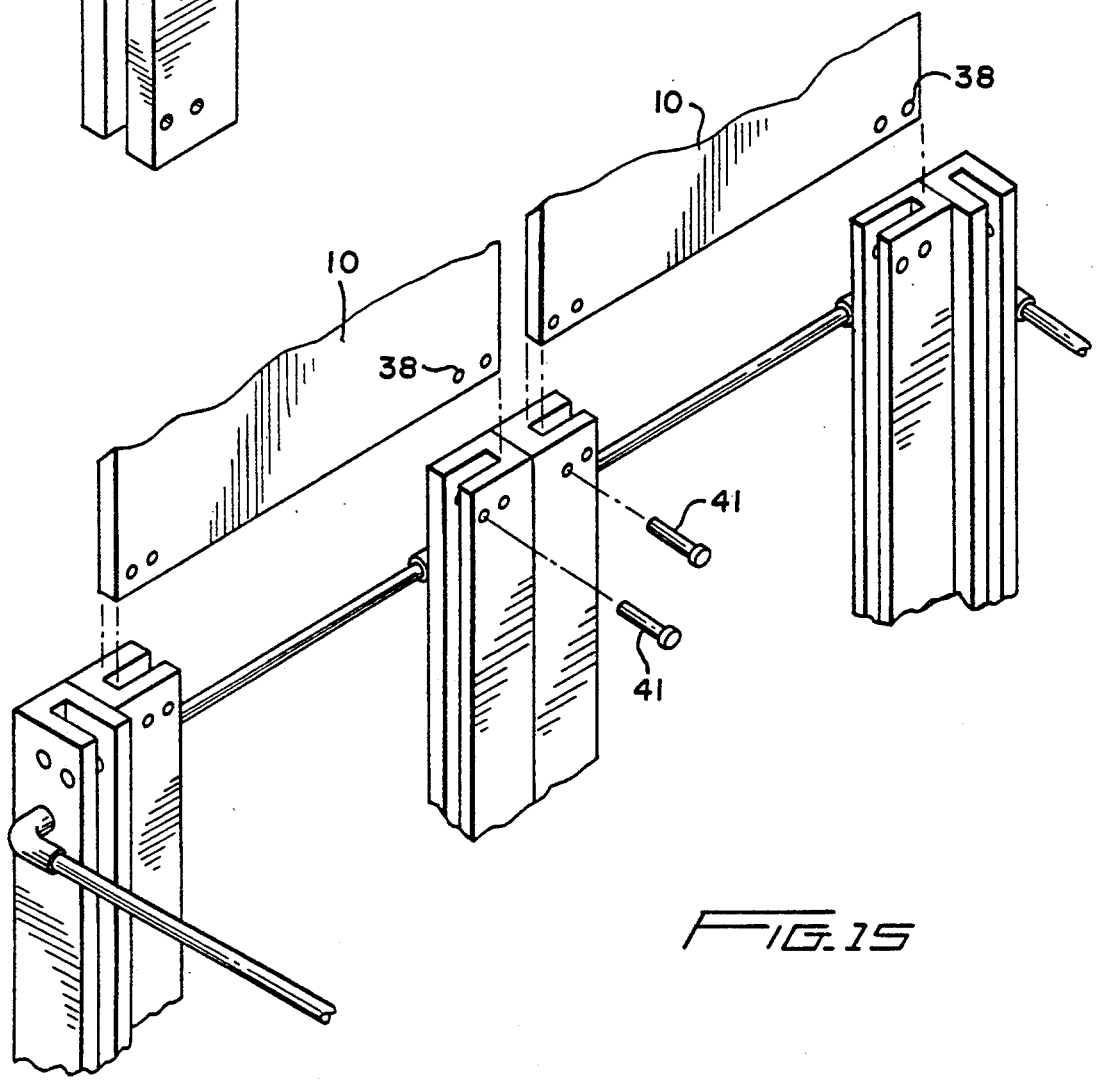
FIG. 15 is a partial perspective view illustrating the formation of a wall in an excavation using the shoring panels, corner posts and side posts of this invention.

The panels made in accordance with this invention, can be converted into a two wall trench shield using a support frame or spreader means 40 such as that shown in FIG. 16, or they can be converted into a four walled pit (hole) shield with the use of a channeled corner post 37 such as that shown in FIGS. 14B and 15. As long as the panels described herein are fastened to the support members, i.e., spreader means 40 or channeled corner post 37, they can be pulled forward in a trench with the progress of the work. As can be appreciated, the panels of this invention can be used to form a wall of extended length, e.g. 24 or 32 or 40 feet, by joining several panels end to end by means of a side post 36 as shown in FIG. 15.

The panels made in accordance with this invention can be assembled in such a way as to be able to provide 2 or 4 wall safety for underground workers in an excavation having utility service lines, e.g., water lines, electrical lines, gas lines, or the like, crossing each other at random angles and heights. For example, as illustrated in FIG. 18, first and second frame members 10A and 10B can be fastened to a spaced pair of spreader means 40A and 40B so as to define a support fame which can be placed in an excavation such that the frame spans utility services 46, 47 which enter and leave the excavation at various angles. Then, by supporting a plurality of panels 10 from the frame members 10A and 10B, for example by hangers 48 fastened to the panels 10 by means of pins 49, screws or the like, opposing walls can be erected for protecting workers. It will be appreciated that by appropriately selecting the locating of each panel 10 along the length of the frame members 10A and 10B, it is possible to accommodate utility service lines crossing the excavation or crossing each other at virtually any angle. It will also be appreciated that the frame members 10A and 10B can be constructed from panels 10 made in accordance with this invention.

In addition to their strength the panels prepared as described herein are non-corrosive and do not crack as a result of moisture as is the case with cement. This prevents both water seepage and the entry of varmints through its structure. It would also minimize the seepage of underground gases that would normally permeate the more porous cement walls. As a consequence, the panels described herein when formed into a box or vault 50 (FIG. 19) used for the purpose of maintaining operating equipment, such as in a manhole, would offer increased security and protection for both underground workers and operating equipment. The vault 50 would require corner posts 37, set in a vertical plane at the points where two panels 10 are placed at right angles to each other. The panels would be secured to the corner posts, for example, by means of fastening pins 41 or the like, and the areas of joining would be sealed by means of appropriately sized filler pieces 49 and sealant to prevent seepage of either water or air. In addition, for the formation of a vault 50, a top panel or ceiling panel 51, having a trap door 52 or other suitable means of ingress and egress, and a bottom panel or floor panel (not shown), would have to be joined with the wall panels 10 through the use of unit posts 34 and appropriately sized filler pieces 49 positioned along a horizontal plane and sealed against seepage of either water or air or other gases. In order to effect a suitable seal against seepage of either water or air at the areas of joining of the respective panels, posts and filler pieces, a conventual butyl rubber, epoxy, polyurethane or silicone adhesive/caulking compound would be used.

Thus, the panels prepared as described herein would serve as a temporary means for protecting underground utility workers during operations that will ultimately require the filling and closure of the hole such as the case when installing, maintaining or repairing lengths of pipe or cable, valve and meter boxes and the like. When an installation is required that leaves a protected hollow in the ground, such as would be necessary to accommodate a utility vault or underground splice box, the panels could be assembled in such a way as to permit the structure to remain in the ground on a permanent basis, thereby eliminating several very costly steps required in underground construction, and providing a secure facility for operating equipment.

It is to be understood that the above-described embodiments are simply illustrative of the principles of the inventions and that various other modifications and changes may be devised by those skilled in the art which will embody the principles of the invention and fall within the spirit and scope thereof as set forth in the following claims:

What is claimed is:

1. A structural composite panel which is adapted to be used as a shoring panel in a generally vertical plane so as to protect against the collapse of excavated walls and which comprises:
    (a) a first substantially flat facing layer for providing an interface between an excavation wall and an underground worker;
    (b) a second facing layer spaced from said first facing layer and extending substantially parallel thereto;
    (c) four end sections integrally formed along the entire perimeter of the panel and connecting said first and second facing layers along the entire periphery thereof; and
    (d) core means disposed between said first and second facing layers, said core means having generally flat first and second surfaces lying substantially parallel to said first and second facing layers and having substantially flat end sections disposed generally perpendicular to said first and second facing layers, said core means being comprised of cellular material having a high strength to weight ratio and having a length and width substantially greater than the thickness thereof;
wherein said first and second facing layers comprise at least four layers of fiber reinforced hardenable resin material, wherein a first of said layers of fiber reinforced hardenable resin material is disposed adjacent to said first surface and is comprised of fiber matting, wherein a second of said layers of fiber reinforced hardenable resin material is disposed adjacent to said core means and is comprised of fiber matting, and wherein the remainder of said at least four layers of fiber reinforced hardenable resin material are adjacent to each other, are disposed between said first and second layers of fiber reinforced hardenable resin material and are comprised of fiber roving; wherein said hardenable resin material is selected from the group consisting of epoxy, phenolic, vinylester, polyester, polyamide, polyamide, polyurethane and polysulphone resin material; wherein said fiber matting and said fiber roving fiber reinforcing material are disposed in said resin material such that the fibers thereof lie in a generally planar array which is substantially parallel to said first and second facing layers; wherein said panel weighs less than about .6 pounds per square foot; and wherein said panel, when supported over its entire height, on each vertical extending end, by no more than 5 inches, is able to withstand an extended load in Type C soils (OSHA, CFR 1926) of at least 592 pounds per square foot with a minimum safety factor of 3:1.

2. The panel of claim 1, wherein said core means comprises a plurality of generally rectangular blocks having flat first and second surfaces lying substantially parallel to said first and second facing layers and having substantially flat end walls disposed generally perpendicular to said first and second facing layers, said cellular blocks being disposed in a spaced planar array in a single layer such that said end walls of each adjacent pair of blocks defines a channel-like space which extends between each adjacent pair of blocks generally perpendicularly from said first facing layer to said second facing layer, said blocks having a length and width substantially greater than the thickness thereof and being characterized by a high strength to weight ratio; and wherein said hardenable resin material additionally is disposed in said channel-like spaces between said cellular blocks and on all surfaces of said blocks so as to essentially exclude any air from being present in said panel.

3. The panel of claim 1, wherein said panel comprises a generally rectangular configuration.

4. The panel of claim 2, wherein said panel comprises a generally rectangular configuration.

5. The panel of claim 2, wherein said generally rectangular blocks comprise balsa wood blocks.

6. The panel of claim 5, wherein said balsa wood blocks have a length of from about 2 in. to about 12 in., a width of from about 2 in. to about 12 in. and a thickness of from about 0.5 in. to about 3 in.

7. The panel of claim 5, wherein said balsa wood blocks are spaced at least about 0.25 in. from the periphery of said panel structure, and wherein said first and second facing layers are from about 0.1875 in. to about 0.50 inches thick.

8. The panel of claim 7, wherein said balsa wood blocks are spaced from each other so as to define a channel-like space having a width of from about 0.0313 to about 0.5 in.

* * * * *